United States Patent [19]
Brehm et al.

[11] Patent Number: 5,236,536
[45] Date of Patent: Aug. 17, 1993

[54] APPARATUS FOR SURFACE TREATMENT BY CORONA DISCHARGE

[75] Inventors: Claude Brehm, Montrouge; Pierre Lerner, Gif sur Yvette; Jean-Louis Brisset, Paris; Jean-Yves Boniort, Limours; Denis Robion, Rouen, all of France

[73] Assignee: Alcatel Fibres Optiques, Bezons, France

[21] Appl. No.: 964,840

[22] Filed: Oct. 22, 1992

[30] Foreign Application Priority Data

Oct. 23, 1991 [FR] France .................................. 91 13096

[51] Int. Cl.$^5$ .......................... C23C 16/00; B01J 19/08
[52] U.S. Cl. ................................ 156/345; 422/186.05; 118/723
[58] Field of Search .................... 118/723; 422/186.05, 422/186.06; 156/345

[56] References Cited

U.S. PATENT DOCUMENTS

| | | | |
|---|---|---|---|
| 3,057,792 | 10/1962 | Frohlich | 204/165 |
| 3,472,756 | 10/1969 | Punderson | 204/312 |
| 3,484,363 | 12/1969 | Williams | 204/312 |
| 5,135,724 | 8/1992 | Dinter | 422/186.05 |
| 5,160,592 | 11/1992 | Spitsin | 422/186.05 |

FOREIGN PATENT DOCUMENTS 377877 7/1907 France .

OTHER PUBLICATIONS

Patent Abstracts of Japan, vol. 7, No. 147 (C-173)(1292) Jun. 28, 1983 and JP-A-58 058 147 (Shimazu Seisakusho) Apr. 6, 1983.

*Primary Examiner*—Richard Bueker
*Attorney, Agent, or Firm*—Sughrue, Mion, Zinn, Macpeak & Seas

[57] ABSTRACT

Apparatus for treating the surface of a body by corona discharge, the apparatus comprising:

- a reaction enclosure through which said body to be treated can run along a "through" axis;
- an electrode raised to a "treatment" potential;
- a counter-electrode raised to a potential that is lower in absolute value than the potential of said electrode, said counter-electrode surrounding said through axis and said electrode and said counter-electrode together being disposed so as to define a "plasma-generating" zone in the vicinity of said through axis and in which said corona discharge takes place; and
- at least one passage formed in said enclosure to feed a plasma-generating reagent gas for treatment purposes;

wherein said electrode is provided with a plurality of portions having small radius of curvature, i.e. having ends that are tapering or pointed, said portions pointing towards said through axis, and being disposed in such a manner that, when projected onto a plane orthogonal to said through axis, their small-radius-of-curvature ends surround the projection onto said plane both of said through axis and of the outline of said body to be treated.

18 Claims, 4 Drawing Sheets

APPARATUS FOR SURFACE TREATMENT BY CORONA DISCHARGE

The present invention relates to an apparatus for surface treatment by corona discharge, and more particularly to an apparatus for applying surface treatment to the outside of an elongate body, i.e. a body having one dimension, called its "length", that is much greater than its other two dimensions, e.g. an optical fiber, a cable, a bar of arbitrary section, etc. The term "longitudinal axis" is used of such a body to designate a median straight line passing through the body lengthwise, and the body is said to be elongate along its longitudinal axis.

BACKGROUND OF THE INVENTION

An apparatus of this type for applying surface treatment by means of a plasma, where a corona type discharge of electricity is used, is described in the patent JP-A-58 058147, for example.

That apparatus includes an enclosure provided with an inlet opening and an outlet opening enabling a wire or any other body to be treated to pass right through the enclosure. Inside the enclosure there are to be found a first, or "high tension" electrode constituted by two plates connected to a high tension generator; and a second, or "counter-" electrode constituted by grids surrounding the body to be treated where it runs through the enclosure.

The counter-electrode is situated between the high tension electrode plates and is raised to a potential that is smaller than said high tension. Finally, a feed passage for a reagent gas is also provided in the enclosure.

The corona discharge appears in a zone situated adjacent to the high tension electrode and to the body to be treated. The discharge is made using a direct voltage or an alternating voltage, and it enables "heavy" (or active) species in the plasma, i.e. molecules, radicals, ions, or atoms, to be grafted onto the surface to be treated. These heavy species come from exciting electrons of molecules injected into the vicinity of the high tension electrode, by the electrons colliding with electrons from the high tension electrode as released by the corona effect. The charged species (ions) produced in this way in the inter-electrode gap are entrained from the high tension electrode towards the counter-electrode under the effect of the electric field, and the non-charged species (molecules, radicals, atoms) are moved in the same direction by the electric wind. On impacting against the material constituting the surface of the body to be treated, the active species reacts, in particular with said material.

The previously-described apparatus is not satisfactory since it does not enable the entire outside surface of the body to be treated in a manner that is uniform and homogeneous.

The object of the present invention is thus to provide apparatus for surface treatment by corona discharge that enables an elongate body to be treated homogeneously.

SUMMARY OF THE INVENTION

To this end, the present invention provides an apparatus for treating the surface of a body by corona discharge, the apparatus comprising:

a reaction enclosure through which said body to be treated can run along a "through" axis;

an electrode raised to a "treatment" potential;

a counter-electrode raised to a potential that is lower in absolute value than the potential of said electrode, said counter-electrode surrounding said through axis, and said electrode and said counter-electrode together being disposed so as to define a "plasma-generating" zone in the vicinity of said through axis and in which said corona discharge takes place; and at least one passage formed in said enclosure to feed a plasma-generating reagent gas for treatment purposes;

wherein said electrode is provided with a plurality of portions having small radius of curvature, i.e. having ends that are tapering or pointed, said portions pointing towards said through axis, and being disposed in such a manner that, when projected on a plane orthogonal to said through axis, the small-radius-of-curvature ends surround the projection on said plane both of said through axis and of the outline of said body to be treated.

This apparatus thus makes it possible to treat the outside surface of an elongate body homogeneously since all of said outside surface faces the high tension electrode, either as the body runs through the enclosure, or else when the body is stationary inside the enclosure.

In one possible embodiment, the high tension electrode may be constituted by a stack of rings made of a conductive material and having a section that presents an acute angle pointing towards the axis through the enclosure.

In a second possible embodiment of the invention, the high tension electrode may alternatively be constituted by a metal wall that is circularly symmetrical about the axis through the enclosure and that has its entire inside surface facing said axis covered with spikes pointing towards the axis. The wall of the high tension electrode may thus be covered by a plurality of spikes situated in a given plane orthogonal to the through axis. More particularly, it may have four spikes disposed at 90° to each other.

These embodiments of the high tension electrode satisfy both the requirements for producing the corona effect (applying a high tension to a surface of small radius of curvature), and for obtaining uniform treatment of an elongate body along the axis of the enclosure.

With high tension electrodes made in accordance with one of the above-specified embodiments, it is possible to use a counter-electrode constituted by a cylindrical grid, interposed between the high tension electrode and the through axis, and connected to ground. Using this disposition, active species that are ionized by the corona discharge are trapped by the counter-electrode and do not participate in treating the surface, while the counter-electrode allows neutral active species to pass through it.

When the high tension electrode includes four spikes disposed at 90° to one another, the counter-electrode has a central channel centered on the through axis and is disposed after the high tension electrode along said axis, being isolated from the high tension electrode by means of an insulating spacer that likewise has a central channel centered on the through axis.

In an advantageous variant, the high tension electrode may be constituted by a plurality of compartments stacked along the through passage of the enclosure, and separated from one another by planes orthogonal to the through axis, the small-radius-of-curvature ends of the tapering or pointed portions belonging to each compartment being such that when projected onto a plane orthogonal to the through passage they surround the projection onto the same plane both of the through axis and of the outline of the body to be treated.

In such apparatus, the enclosure includes a plurality of reagent feed passages, each of said passages being in communication with a distinct one of the compartments and feeding a reagent gas of distinct composition, and means are provided in the enclosure for preventing these various gases from mixing. In addition, each of the compartments is separated from the other compartments by insulator means and is raised to a different potential.

This variant makes it possible to subject the body running along the through axis of the enclosure to different successive treatments, with the potentials of each of the compartments being adapted to the composition of the reagent gas contained therein.

In one embodiment of said variant, the high tension electrode is constituted by two compartments that are separated from each other by an insulating washer, the first of said compartments that is encountered by the body to be treated as it runs through the enclosure being associated with a feed for a plasma-generating reagent gas that cleans its surface, while the second compartment is in communication with a feed for a reagent gas that treats the surface of the body.

In a final variant, the enclosure has an inlet opening and an outlet opening both of which are in communication with the medium outside the enclosure, and which enable the body to be treated to pass through the enclosure. In the vicinity of each of said openings, there is a feed passage for a gas that is inert relative to corona discharge at the treatment potential, which gas is fed at a pressure higher than that of the reagent gas inside the enclosure.

This variant makes it possible to treat the surface of the body to be treated without interrupting the manufacturing line for said body.

Preferably, in order to avoid phenomena of preferential discharges, the inter-electrode distance is constant (with the inter-electrode distance being measured in a plane orthogonal to the longitudinal axis and along a straight line intersecting said axis).

Finally, the travel speed of the body to be treated through the enclosure may be zero.

The apparatus of the invention may be applied, for example, to fluorination of the covering of optical fibers in the presence of a plasma-generating fluorocarbon gas that is pure or that is diluted with argon.

The apparatus may also be applied to treating the outside surface of a cable having a sheath.

BRIEF DESCRIPTION OF THE DRAWINGS

Embodiments of the invention are described by way of example with reference to the accompanying drawings, in which.

DETAILED DESCRIPTION

Figure 1:
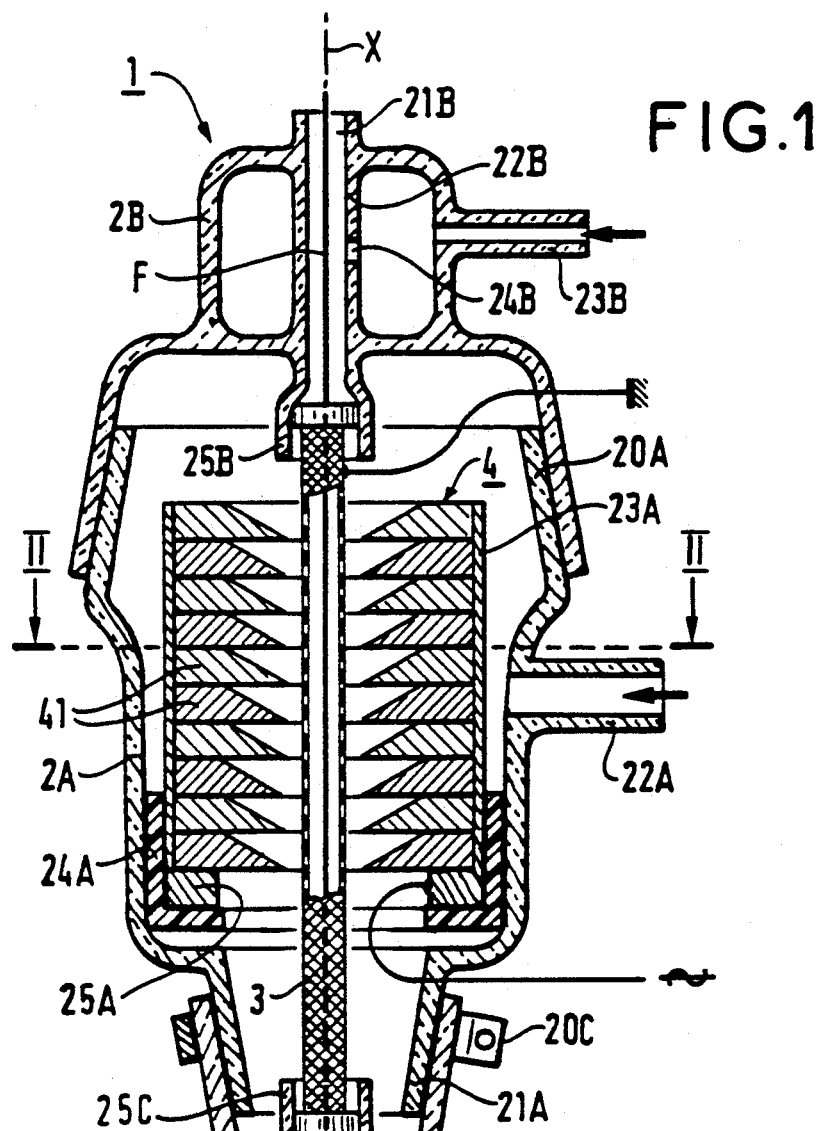
FIG. 1 is an elevation view in partial section through a first apparatus of the invention.
Figure 2:
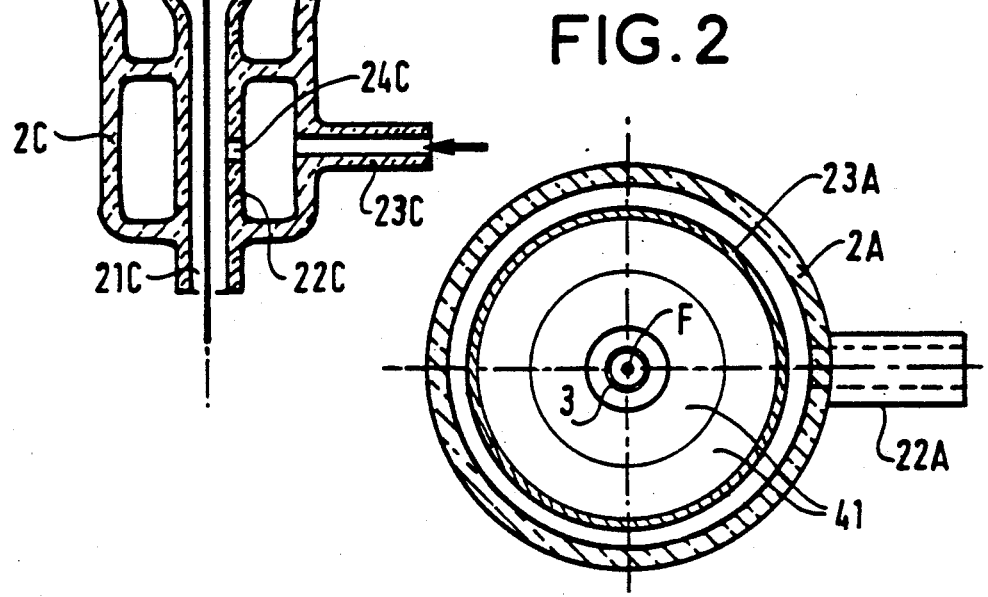
FIG. 2 is a cross-section on line II—II of FIG. 1.

FIGS. 1 and 2 show a first apparatus of the present invention. This apparatus comprises a reactor 1 constituted by a glass or silica enclosure inside which there is a counter-electrode 3 connected to ground, together with a high tension electrode 4 connected, for example, to a direct high tension generator (not shown) and raised to a "treatment" potential.

More particularly, the enclosure is constituted by a central portion 2A and by two end portions 2B and 2C that are installed on the central portion 2A which is provided for this purpose with two conical ends 20A and 21A that co-operate with the end portions 2B and 2C. The end portion 2B forms the cover of the enclosure while the end portion 2C forms the bottom thereof.

The central portion 2A has a feed passage 22A for a reagent gas such as an oxidizing gas, for example, for the purpose of cleaning a surface and facilitating adhesion of subsequent coatings, a rare gas for improving adhesion of a surface, a chlorine-containing gas for cleaning and dehydrating a surface, or a fluorine-containing gas for making a surface hydrophobic and anti-adhesive. Depending on the desired treatment, the pure reagent gas may be used as reagent gas and as plasma-generating gas. However, it is preferable to dilute said gas in a non-reactive plasma-generating gas, e.g. argon, nitrogen, or any other inert gas that facilitates the appearance of corona discharge and that improves the effects thereof. Naturally, if the reagent gas and the plasma-generating gas are different, they may each be fed separately into the enclosure via distinct passages.

Each of the end portions 2B and 2C also includes a respective opening 21B or 21C. These openings are disposed along an axis X that passes right through the enclosure, and inside the end portions 2B and 2C they communicate with cylindrical tubes 22B and 22C that open out into the central portion 2A and that put the medium inside the enclosure into communication with the medium outside it. They enable a body such as an optical fiber F, for example, to pass through the enclosure by running along the X axis, which is referred to as the "through" axis, for this reason. Each of the end portions 2B and 2C is also provided with a feed passage 23B or 23C for feeding a gas that is inert under plasma conditions, e.g. argon. This gas is injected at a higher pressure than the plasma-generating reagent gas, and serves to confine said reagent gas inside the reactor 1. To this end, the tubes 22B and 22C are pierced inside the end portions 2B and 2C with respective openings 24B and 24C enabling the higher pressure gas to penetrate into the central portion 2A.

The counter-electrode 3 is formed by a grid that is cylindrical about the axis 3 and whose outside diameter lies in the range 4 mm to 10 mm, for example. It occupies the entire height of the central portion 2A and it is held therein by means of two supports 25B and 25C that extend the tubes 22B and 22C inside the central portion 2A.

The high tension electrode 4 is made of stainless steel, for example, and is raised to a positive or negative direct high tension lying in the range 3 kV to 30 kV (in absolute value). It may also be raised to an alternating tension whose amplitude lies in the range 3 kV to 30 kV. It is made firstly so as to provide the conditions that are required for causing the corona effect to appear, and secondly so as to treat all of the outside surface of the fiber F. In well known manner, in order to satisfy the requirement of producing a corona discharge, it is preferable for the inside surface of the high tension electrode 4 that faces the axis X to include portions having a small radius of curvature, pointed portions or tapering portions, for example. To this end, the ratio of the radius of curvature of the counter-electrode 3 divided by the radius of curvature of the pointed or tapering portions of the high tension electrode 4 should be not less than a few tens.

In order to treat the entire outside surface of the fiber F, the high tension electrode 4 is constituted by a stack of metal rings 41 about the axis X and extending along all or part of the height of the central portion 2A. Said rings are disposed coaxially around the outside of the counter-electrode 3, and may be of arbitrary cross-section. The section of each of the rings 41 is pentagonal and has an acute angle $\alpha$ of about 20° pointing towards the axis X. The radius of curvature of the tapering portion of the high tension electrode 4 is thus equal to about 0.02 mm. The inside diameter of the high tension electrode 4 as defined by the inside ends of the rings 41 lies in the range 8 mm to 20 mm.

In order to keep the stack of rings 41 centered in the central portion 2A and to connect it to a tension generator, a hollow conductive supporting cylinder 23A about the axis X is used, which cylinder is itself held inside the enclosure 2 by a centering ring 24A of polytetrafluoroethylene (PTFE) for example, which is secured to the central portion 2A. The rings 41 are thus inserted into the cylinder 23A which includes a horizontal bottom 25A to prevent them moving further along the axis X. The cylinder 23A is connected to the tension generator. It is preferable for the high tension electrode 4 to be centered and above all for it to be held accurately coaxial about the counter-electrode 3 in order to avoid phenomena of preferential discharging that can lead to electrical arcs being struck in places where the inter-electrode distance is smaller. Generally speaking, it is therefore desirable to ensure that the inter-electrode distance remains constant. That is why it is preferable for the grid constituting the counter-electrode to be constituted by a perforated metal foil rather than being made of a braid of metal wires. In a braid, some points are always further from the high tension electrode than others.

Using the apparatus shown in FIGS. 1 and 2, when the active substance contained in the inserted plasma-generating reagent gas for treating the surface of the fiber F is constituted by species that are electrically neutral, the ionized active species obtained by ionizing the plasma-generating gas are trapped by the grid 3 while the neutral active species are allowed to pass therethrough.

Figure 3:
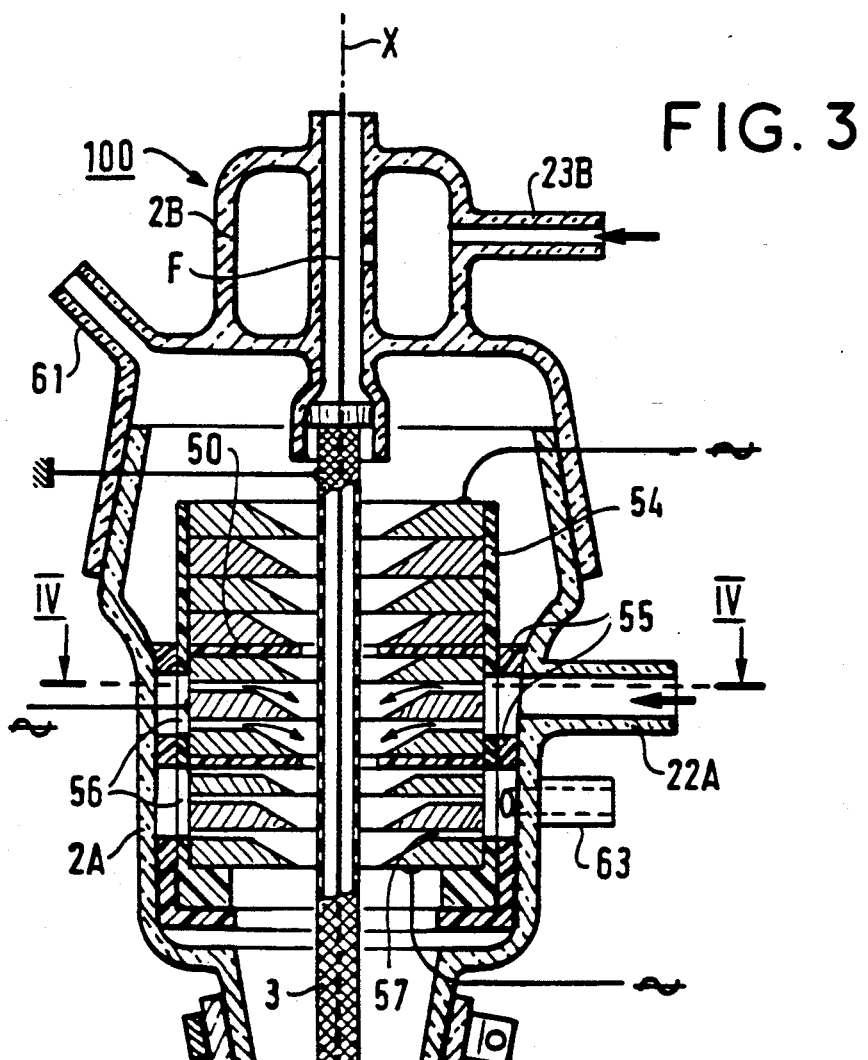
FIG. 3 is an elevation view in partial section through a second apparatus of the invention.
Figure 4:
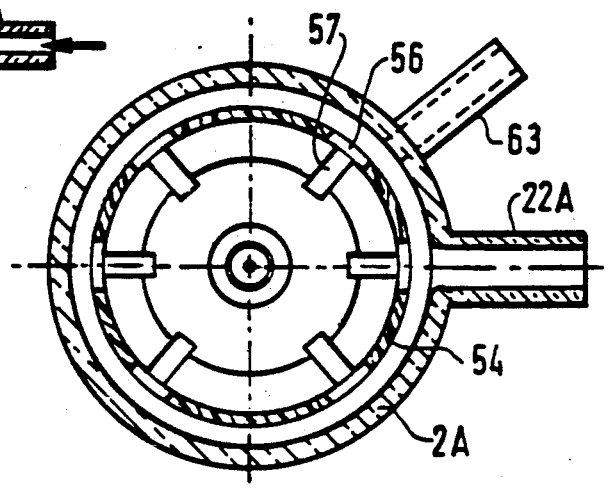
FIG. 4 is a section on line IV—IV of FIG. 3.

FIGS. 3 and 4 show a second apparatus of the invention. In these figures, items that are common to items in the preceding figures are given the same reference numerals. The apparatus shown is given overall reference 100. This apparatus is similar to that of FIGS. 1 and 2 except for its high tension electrode 400. In this case, the electrode 400 is still made up of a stack of rings 41. However, unlike the apparatus shown in FIGS. 1 and 2, two insulating washers 50, e.g. made of alumina, are disposed to split the stack up into three groups of rings 41, thereby forming three compartments. Each of these compartments is associated with a distinct plasma-generating reagent gas feed passage 61, 22A, and 63. In addition, level with each washer 50 and outside the alumina supporting cylinder 54 for the electrode 400, there are two insulating rings 55 for splitting up the reagent gas feeds to the compartments. The rings 55 thus delimit portions of the enclosure that are isolated from one another so that the various reagent gases fed via the passages 61, 22A, and 63 do not mix together, particularly when these gases are of different compositions.

In order to inject these gases between the electrode 400 and the counter-electrode 3, openings 56 (see FIG. 4) are formed through the supporting cylinder 54. These openings 56 communicate with passages 57 made for this purpose between the electrodes 41 of the stack. For the top compartment, i.e. the compartment above the other two, the gases arriving via the passage 61 penetrate therein directly. This compartment is open towards the portion 2B of the enclosure 2. However, in other embodiments, it would naturally be possible to apply the same dispositions to the top compartment as are applied to the other two compartments.

Finally, the electrode rings 41 in each of the compartments are raised to distinct potentials enabling treatment to be performed with the gas in the corresponding compartment. The insulating washers 50 are designed to provide electrical insulation between the various compartments.

Using the apparatus 100, it is thus possible to cause the fiber F running along the axis X to be subjected to different treatments in succession. For example, when an oxidizing reagent gas is injected via the passage 61 and a fluorocarbon reagent gas is injected via the passages 22A and 63, with the compartments being raised to appropriate potentials, the surface of the fiber F is initially cleaned immediately after it penetrates into the reactor, and prior to being treated so that it becomes hydrophobic and anti-adhesive. In this way, fluorine-containing molecules are better grafted onto the surface of the fiber F.

Figure 5:
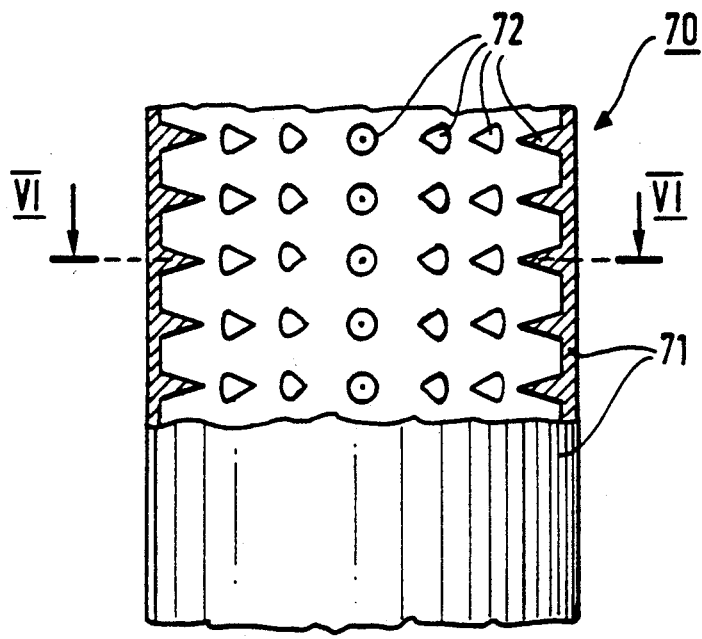
FIG. 5 is a view partially in section on line V—V of FIG. 6, showing a possible alternative high tension electrode for the apparatuses of FIGS. 1 to 4.
Figure 6:
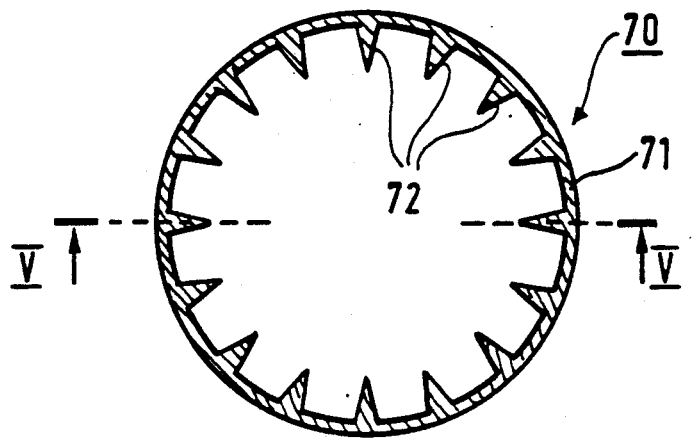
FIG. 6 is a cross-section view on line VI—VI of FIG. 5.

FIGS. 5 and 6 show another possible form for the high tension electrode that makes it possible to obtain the desired radius of curvature ratio that enables a corona discharge to be implemented. This electrode 70 comprises a cylindrical metal wall 71 acting as the supporting cylinder of the preceding figures and covered with a plurality of radially extending spikes 72 on its entire inside surface, the spikes facing the axis X. This electrode may be called a "dog collar" electrode.

Figure 7:
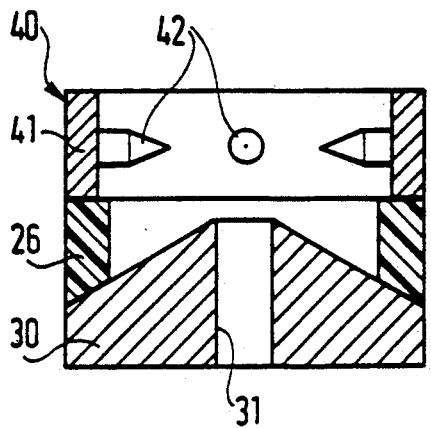
FIG. 7 is an elevation view in partial section of a third apparatus of the invention.
Figure 8:
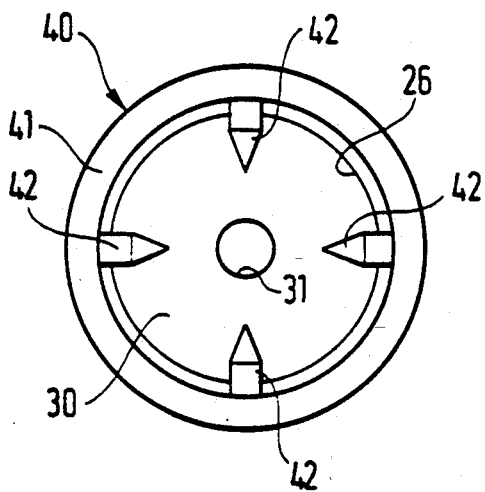
FIG. 8 is a plan view of FIG. 7.
Figure 9:
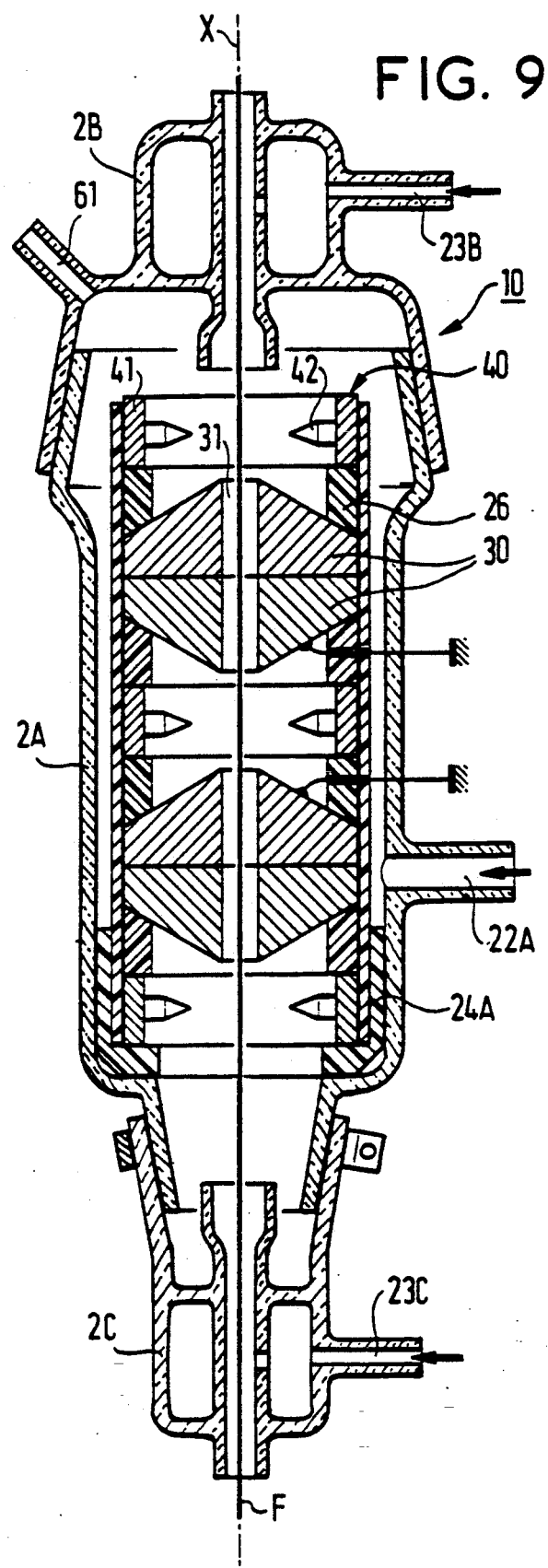
FIG. 9 is an elevation view in partial section of a variant of the apparatus shown in FIGS. 7 and 8.

Finally, FIGS. 7 and 9 show a third apparatus of the invention. In these figures, items that are common with the preceding figures are given the same reference numerals. The apparatus shown is given overall reference 10. This apparatus is similar to the apparatus of FIGS. 1 and 2 with the exception of the counter-electrode 30 and of the electrode 40. In this case, the counter-electrode 30 is constituted by a metal portion in the form of a truncated cone about the axis X. The center of this truncated cone portion 30 is pierced along the axis X by a cylindrical channel 31 through which the fiber F passes. The high tension electrode 40 is constituted by a cylindrical metal wall 41 having four radial spikes 42 disposed at 90° intervals from one another (see FIG. 8) projecting inwards towards the axis X from the inside surface of the wall. The spikes 42 are generally cylindrical in shape, with conical ends. In order to isolate the electrode 40 electrically from the counter-electrode 30, a tubular insulating electrode 26 that is cylindrical about the axis X is disposed between said electrodes inside the enclosure. Such an apparatus enables surface treatment to be performed on the fiber F by means of active species, including both charges species and neutral species, should that be necessary. While the fiber F is running along the axis X, it is "bombarded" on either side by ionized active species that are not intercepted by the counter electrode 30, and also by neutral active species.

The height of the cylinder 41 along the axis X is 10 mm and its diameter is 34 mm, the height of the spacer 26 is 7 mm, and that of the counter-electrode 30 is 13.5 mm. The diameter of the channel 31 is 5 mm. The diameter of the cylindrical base of the spikes 42 is 3 mm and the length of their conical tips is 8 mm.

A plurality of assemblies like that constituted by the electrode 40, the counter-electrode 30, and the insulating spacer 26 are stacked within the enclosure of the device 10 so as to form separate compartments within which distinct treatments are performed, as in the variant shown in FIGS. 3 and 4. Naturally, a single assembly as shown in FIG. 7 could be used on its own.

In addition, although only four radial spikes constitute the high tension electrode 40 in the example shown in FIGS. 7 to 9, it is naturally obvious that said electrode could include a number of radial spikes situated in a single plane that is greater than or less than four without going beyond the ambit of the invention.

Experiments have been performed using apparatus having a single assembly as shown in FIG. 7.

In a first experiment, treatment was performed in air, i.e. in an oxidizing atmosphere, on a fiber F1 of length 25 mm and held stationary inside the enclosure along its axis X, with the distance between the spikes 42 and the fiber F1 being 7 mm. The electrode 40 was raised to a direct potential of 10 kV and the current was 75 $\mu$A to 80 $\mu$A. After treatment having a duration of 2 hours 30 minutes, the angle of contact in water of the treated sample was measured, giving a value of 29.4°. It is recalled that the angle of contact is a measure of the adhesion of the sample: the lower the angle of contact, the greater the adhesion. The angle of contact in water of the non-treated fiber F1 is about 70°.

The treatment thus makes it possible to obtain the desired properties with respect to adhesion, and it is also uniform over the entire outside surface of the fiber F1.

In a second experiment, treatment was performed on the fiber F1 while still stationary in the enclosure, with the spikes 42 being at the same distance, but in an atmosphere of difluoroethylene, so as to fluorinate the outer covering of the fiber F1. The treatment potential was direct and at 11 kV to 12 kV, and the current was about 50 $\mu$A to 60 $\mu$A. The angle of contact in water of the fiber F1 treated in this way is 95°, showing that the treatment makes it possible to obtain the looked-for anti-adhesion properties. It is likewise uniform over the entire outside surface of the fiber F1.

Using the apparatuses of the invention, the entire outside surface of a circularly symmetrical body can thus be treated in uniform manner.

In addition, for an optical fiber, for example, the treatment may be performed in line, after the fiber has been covered and before it is applied to a storage capstan. When adding an operation that applies surface treatment to the outer covering, it is possible to comply with the speed at which the fiber is drawn, covered, and wound onto the capstan (which speed lies in the range 10 meters per minute to 1,000 meters per minute, for example), and thus without slowing down the manufacturing process. This is achieved by injecting the gas under pressure so as to confine the reagent gas inside the enclosure even though it is open to the surrounding medium at atmospheric pressure.

If the manufacturing speed is too fast to enable the active species in the corona discharge to be grafted onto the surface of the body to be treated, then the height of the zone in which the corona effect takes place can be increased, e.g. by placing a plurality of identical reactors one after another.

Naturally, the present invention is not limited to the embodiments described above.

The structures described for the electrodes of the above devices merely constitute non-limiting examples. The structure of the high tension electrode may be arbitrary providing it satisfies the following requirements:

it has a surface with a radius of curvature that is small compared with that of the counter-electrode and that is disposed to face the surface of the body to be treated; and the surface to be treated is treated uniformly.

To satisfy the latter requirement, if the body to be treated remains at rest relative to the high tension electrode, i.e. if its running speed is zero, said electrode should surround the body to be treated. Thus, the entire surface of the body faces the surface of small radius curvature on the high tension electrode. The apparatuses described above may be used in this type of application. Naturally, those apparatus or equivalents thereof may also be used for treating a body running through the enclosure along the axis X.

However, when the body does run through the enclosure, it is sufficient for the ends of the pointed or tapering portions of the high tension electrode, when projected onto a plane orthogonal to the through axis and when joined together, to give rise to a closed curve that surrounds the outer periphery of the body to be treated when it too is projected onto the same plane; thus, when the body runs past a high tension electrode, successive portions of the surface of the body face small-radius-of-curvature portions of the high tension electrode. The treatment is thus uniform over the entire surface.

In addition, when the high tension electrode includes a plurality of compartments separated from one another by insulation and associated with feeds for reagent gases of distinct compositions, the above criterion concerning projection onto a plane orthogonal to the through axis must be satisfied by each compartment of the high tension electrode (where the portions of the high tension electrode are delimited by pairs of planes orthogonal to the running axis). This condition must be satisfied if the surface of the body is to be treated uniformly by each of the reagents. The apparatuses shown in FIGS. 3, 4, and 9 correspond to such an application.

The apparatus of the invention may be used for performing any kind of corona discharge treatment (cleaning, coloring, dehydrating, fluorination, . . .).

It may thus be used, for example, for fluorination of the outer covering of optical fibers, using a plasma-generating reagent gas based on fluorine, or for any other treatment that is applicable to fibers.

It may also be used for treating optical fibers or electrical cables having outer sheaths. The reagent plasma-generating gas may be a fluorocarbon, an oxidizer, a reducer, or it may be based on a rare gas, depending on the desired treatment.

More generally, any body that is elongate along a longitudinal axis may be treated when at rest or when moving by using apparatus of the invention. It suffices merely to adapt the dimensions of the electrodes, the inter-electrode distance, the materials from which it is made, the distance between the body to be treated and the high tension electrode, and the operating conditions to the material that is to be treated and to the looked-for result.

Finally, any means may be replaced by equivalent means without going beyond the scope of the invention.

We claim:

1. Apparatus for treating the surface of a body by corona discharge, the apparatus comprising:
   a reaction enclosure through which said body to be treated can run along a "through" axis;
   an electrode raised to a "treatment" potential;
   a counter-electrode raised to a potential that is lower in absolute value than the potential of said electrode, said counter-electrode surrounding said through axis and said electrode and said counter-electrode together being disposed so as to define a "plasma-generating" zone in the vicinity of said through axis and in which said corona discharge takes place; and
   at least one passage formed in said enclosure to feed a plasma-generating reagent gas for treatment purposes;
   wherein said electrode is provided with a plurality of portions having small radius of curvature, i.e. having ends that are tapering or pointed, said portions pointing towards said through axis, and being disposed in such a manner that, when projected onto a plane orthogonal to said through axis, their small-radius-of-curvature ends surround the projection onto said plane both of said through axis and of the outline of said body to be treated.

2. Apparatus according to claim 1, wherein said electrode is constituted by a stack of rings of conductive material, each of said rings having a section with an acute angle pointing towards said axis.

3. Apparatus according to claim 1, wherein said electrode is constituted by a metal wall that is circularly symmetrical around the axis of said passage and that is covered over its entire inside surface facing said axis with spikes pointing towards said axis.

4. Apparatus according to claim 3, wherein said wall is covered in a plurality of spikes that are situated in a common plane orthogonal to said through axis.

5. Apparatus according to claim 4, wherein said wall is covered with four spikes situated in a common plane orthogonal to said through axis and disposed at 90° relative to one another in said plane.

6. Apparatus according to claim 2, wherein said counter-electrode is constituted by a cylindrical grid interposed between said electrode and said through axis and connected to ground.

7. Apparatus according to claim 6, wherein said cylindrical grid is constituted by a perforated metal foil.

8. Apparatus according to claim 4, wherein said counter-electrode has a central channel centered on said through axis and is disposed after said electrode along said through axis, being electrically insulated from said electrode by an insulating spacer that also has a central channel centered on the said through axis.

9. Apparatus according to claim 1, wherein said electrode is constituted by a plurality of compartments that are stacked along said through axis and that are separated from one another by planes orthogonal to said through axis, the small-radius-of-curvature ends of said tapering or pointed portions belonging to each compartment being such that when projected onto a plane orthogonal to said axis, they surround the projection onto said plane both of said through axis and of said outline of said body to be treated.

10. Apparatus according to claim 9, wherein said enclosure includes a plurality of reagent feed passages, with each of said passages being in communication with a distinct one of said compartments and feeding a plasma-generating reagent gas of a distinct composition thereto, separation means being provided in said enclosure to prevent said gases of distinct compositions mixing.

11. Apparatus according to claim 9, wherein each of said compartments is separated from the others by insulating means and is raised to a different potential.

12. Apparatus according to claim 9, wherein said electrode is constituted by two compartments that are separated from each other by an insulating washer, the first of said compartments to be encountered by said body as it runs through said enclosure being in communication with a feed for a plasma-generating reagent gas that cleans said surface of said body, and the second compartment being in communication with a feed for a plasma-generating reagent gas that treats said surface of said body.

13. Apparatus according to claim 1, wherein said enclosure has an inlet opening and an outlet opening, said openings being in communication with the medium outside said enclosure and enabling said body to pass through said enclosure.

14. Apparatus according to claim 13, wherein in the vicinity of said inlet and outlet openings there area respective passages for feeding a gas that is inert relative to the corona discharge at said treatment potential, which gas is delivered at a pressure higher than the pressure of said reagent gas inside said enclosure.

15. Apparatus according to claim 1, wherein the inter-electrode distance is constant.

16. Apparatus according to claim 1, wherein the running speed of said body through said enclosure is zero.

17. An application of the apparatus according to claim 1, wherein the apparatus is intended for fluorinating the coverings of optical fibers in the presence of a fluorocarbon plasma-generating gas.

18. An application of the apparatus according to claim 1, wherein the apparatus is intended for performing outside surface treatment on a sheathed cable.

* * * * *